April 28, 1936.　　　　A. B. BELL　　　　2,038,532
CAR SEAT
Filed Dec. 21, 1934　　　3 Sheets-Sheet 2
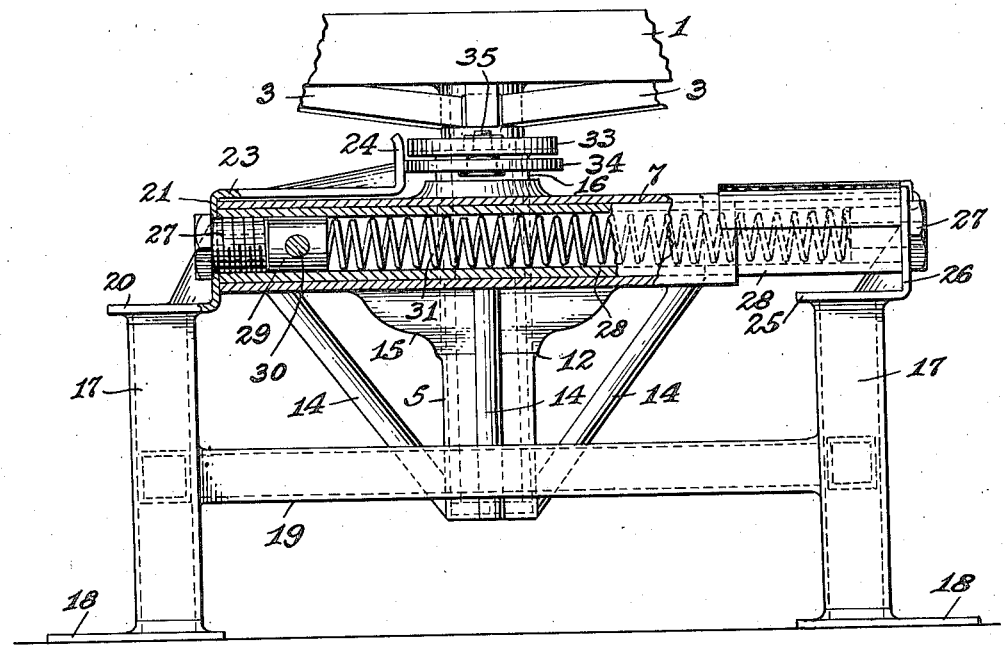
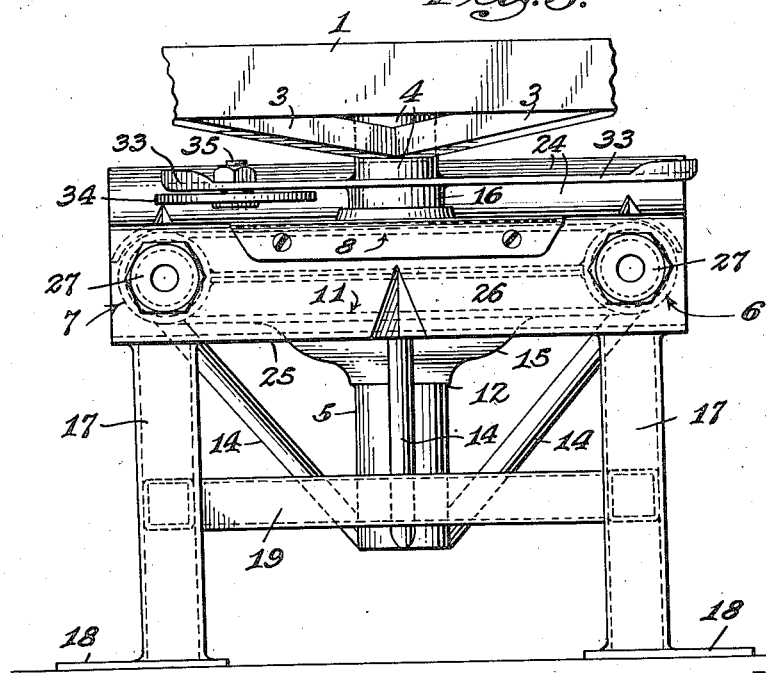
INVENTOR
Alfred B. Bell
BY Henry Van Arsdale
ATTORNEY April 28, 1936.  A. B. BELL  2,038,532
CAR SEAT
Filed Dec. 21, 1934  3 Sheets-Sheet 3

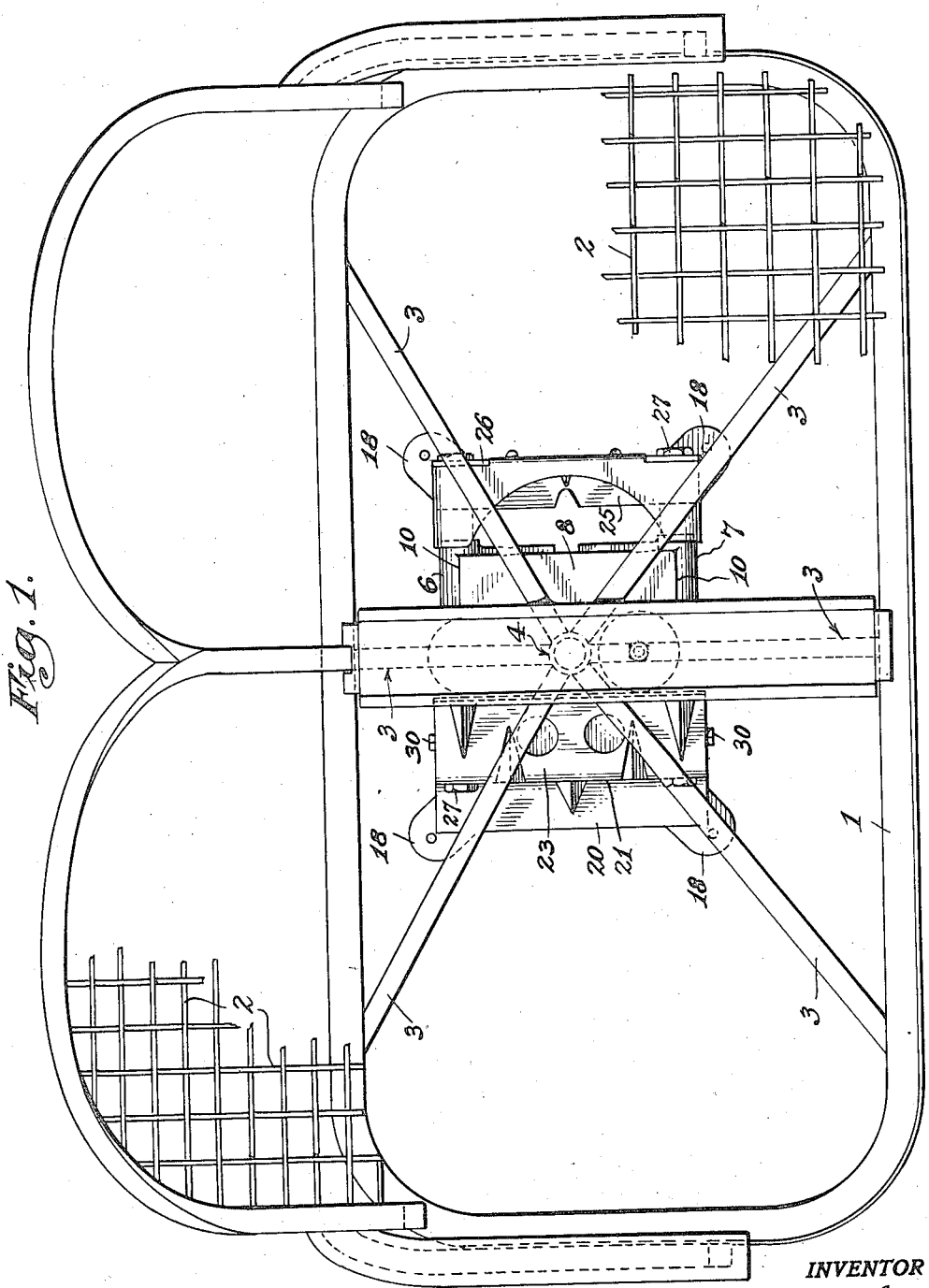

INVENTOR
Alfred B. Bell
BY
Henry Van Arsdel
his ATTORNEY

Patented Apr. 28, 1936

2,038,532

UNITED STATES PATENT OFFICE 2,038,532

CAR SEAT

Alfred B. Bell, Gardner, Mass., assignor to Heywood-Wakefield Company, Boston, Mass., a corporation of Massachusetts Application December 21, 1934, Serial No. 758,570

8 Claims. (Cl. 155—96)

This invention relates to car seats for railway coaches and other vehicles, and more particularly relates to double car seats which can be rotated to face either end of the car.

The trend of the times places great importance on speed and comfort in travel. In railway travel, lightness is an important adjunct to speed, and wide and deep seats with high back and deep upholstery, and freedom from vibration, noise and rattle, all make for comfort. Also important is sturdiness and durability of the construction and avoidance of likelihood of the mechanism becoming dislocated or out of repair, and convenience and ease in reversing the seat. At the same time it is essential that the seats require a minimum of space for reversal so that the car may seat a maximum number of passengers, thus tending to reduce the number of cars required in a train and conserving expense and lightening the train accordingly. It is also desirable that the pedestal of the seat take up as little floor space as possible.

The principal object of this invention is to provide a reversible car seat which is extremely light and comfortable, having full width and depth and full height of back and deep upholstery, having a pedestal that occupies very little floor space, and a seat that requires small space for reversal; and another object of this invention is to provide seat reversing mechanism which is extremely light and simple in construction, and yet sturdy, durable and free of rattle, noise and vibration, and permits the seat to be reversed easily, conveniently and positively, and operates to place an end of the seat close to the car wall when turned to either seating position.

Other objects of this invention will be in part obvious and in part pointed out hereinafter.

In accordance with this invention, the seat frame is rotatably supported on a carriage which is slidably mounted on the pedestal. As the seat is rotated into reversed seating position it, together with its carriage, are first shifted so that the end of the seat avoids the car wall against which the seat is placed, and then shifted back, these movements being accomplished by a cam and spring, the spring also holding the seat firmly in either seating position. The pedestal and the reversing mechanism are extremely compact and light, as will be more fully described hereinafter.

In order that a clearer understanding of this invention may be had, attention is hereby directed to the accompanying drawings, forming a part of this application, and illustrating certain possible embodiments of this invention, and in which:

Fig. 1 is a top plan view of a car seat embodying this invention, the cushioning being omitted and only fragments of the cushion backing being shown;

Fig. 2 is a front elevation, partly in section, of the pedestal and reversing mechanism, including a portion of the seat frame;

Fig. 3 is an end or side elevation of the structure shown in Fig. 2;

Similar reference characters refer to similar parts throughout the several views of the drawings.

Figure 4:
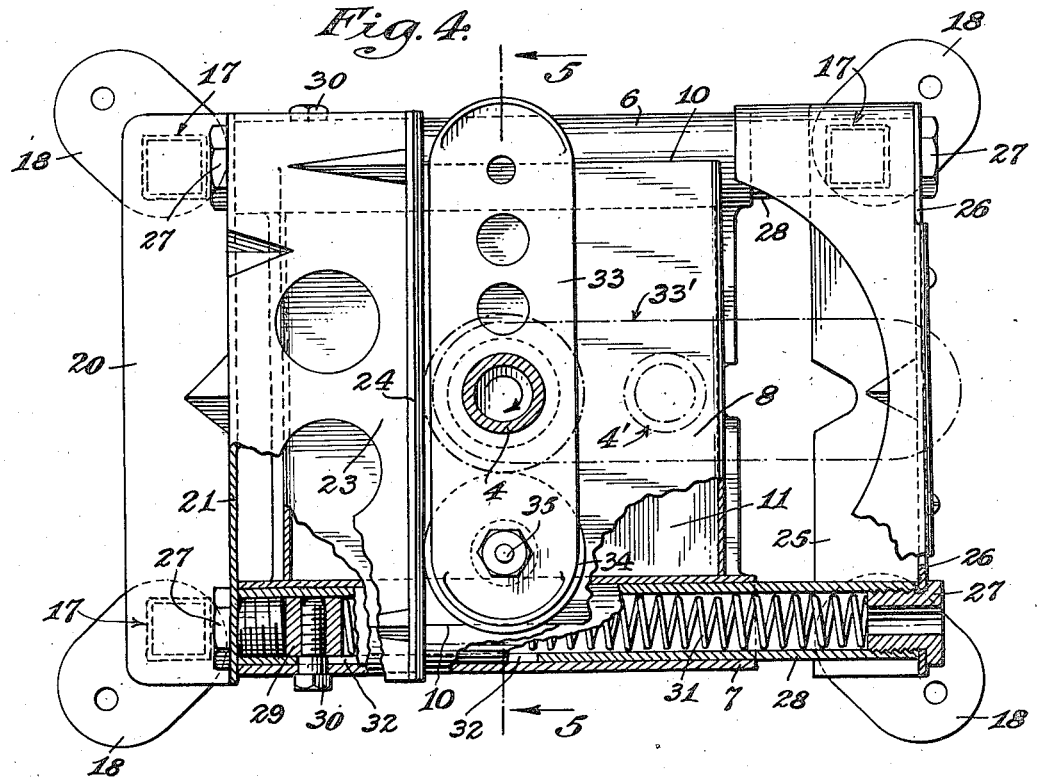
Fig. 4 is a top view, partly in section of the structure shown in Figs. 2 and 3.
Figure 5:
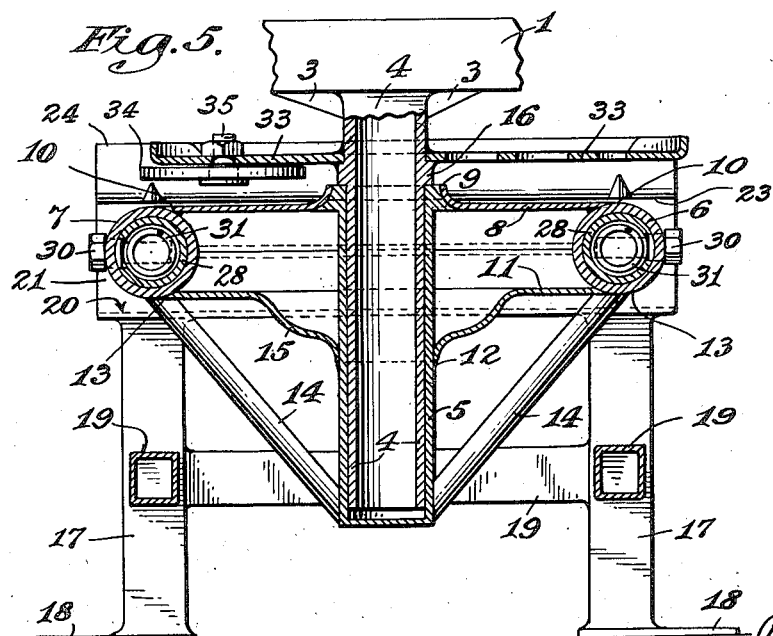
Fig. 5 is a sectional view thereof, and is taken on the line 5—5 of Fig. 4.

Referring to the drawings, the seat comprises seat frame work 1, constituting the frame of a double seat of full width and depth and full height of back, adapted to be provided with deep and comfortable cushioning and upholstery, not shown, for which backing 2 is also provided. Brace members 3, secured to the frame, support a spindle 4, under the center of the frame. This spindle is rotatably journaled in a socket or sleeve 5 of a carriage which also includes two parallel tubes, 6 and 7, on opposite sides of socket 5, an upper plate 8 welded about the upper end of socket 5, as at 9, and to the tops of tubes 6 and 7, as at 10, a lower plate 11, welded about the socket 5 at an intermediate place, as at 12, and to the bottoms of tubes 6 and 7, as at 13, and brace members 14 welded at their upper ends to the lower plate 11 near its edges and to the sleeve 5 near its lower end. As shown, the center of plate 11 is bowed down as at 15 to offer better reinforcement and steadiness. An annular flange 16 on spindle 4 rests on the top of sleeve 5, and determines the extent to which the spindle enters the socket. It is at once apparent that the carriage is very light and compact, and at the same time very sturdy and durable.

The pedestal proper is also extremely light and compact, and occupies little space. It comprises four tubular metal legs 17, each having a foot 18, which may be bolted to the car floor, tubular cross braces 19, extending between the legs 17, a plate having a lower horizontal flange 20 extending across and welded to the tops of the two end legs intended to be positioned toward the car wall, a vertical wall 21 rising from flange 20, a horizontal flange 23 extending from the top of wall 21 and a vertical flange 24 broken up from the edge of flange 23. Extending across and welded to the tops of the two legs at the opposite end of the pedestal is the horizontal wall 25 of an angle plate having vertical wall 26. Extending between and secured to the walls 21 and 26 of these end plates, as by means of screws 27 are two parallel tubes 28, each adapted to extend through one of the tubes 6, 7 of the carriage so that the carriage is slidably supported on the tubes 28. Within each tube 28 is mounted a sliding block 29 which is secured to the adjacent tube of the carriage by means of a screw 30 which passes through a screw hole in the carriage tube 6, 7 and is in threaded engagement with the block 29.

Within each tube 28 a compression spring 31 extends between the block 29 and the screw 27 at the opposite end of the tube. Each of tubes 28 is provided with a slot 32 to permit movement of the block 29 and the carriage tube relatively to the tube 28. Normally the springs 31 maintain the blocks 29 and the carriage tubes toward one end of the tubes 28 and in this position the end of the seat is intended to be close to the car wall and the seat to be in seating position.

There is fastened to the spindle 4 and preferably resting on the spindle flange 16, an arm 33 which at one end has a cam roller 34 rotatably mounted on arm 33 by means of bolt 35.

When the seat is in either seating position arm 33 is parallel with the pedestal flange 24 and the cam roller 34 is disposed toward one end of this wall. When the seat is rotated in the direction indicated by the arrow applied to the spindle in Fig. 4, the engagement of the cam roller 34 with the cam wall 24 causes the spindle 4 and its carriage and the seat to shift at right angles away from the wall 24 and, accordingly, from the car wall against which the seat is disposed so that the end of the seat will avoid the car wall. The position of maximum displacement of the seat is had when the arm 33 is at right angles to the wall 24. This position of the arm is indicated by the broken lines 33' in Fig. 4, and the corresponding position of the spindle 4 is indicated by the broken line 4'. In this position of the seat the carriage tubes 6 and 7 will have been moved correspondingly on the pedestal tubes 28 and the springs 31 will be under corresponding compression. As the seat is then rotated into the reversed seating position, the springs 31 cause the seat and the carriage to return to initial position in which the opposite end of the seat will be taken close against the car wall. The cam roller 34 will then be on the opposite side of the carriage and pedestal from the position shown in Fig. 4. To again reverse the seat it is rotated in a direction opposite from before but similar movements will be imparted to the seat carriage during reversal by the engagement of cam roller 34 against the cam flange 24.

Each time the seat is reversed it can be rotated in one direction only since rotation in the opposite direction is prevented by the tail of arm 33 which would strike the cam flange 24 when rotation in the wrong direction is attempted. However, if the cam roller 34 were duplicated on opposite sides of spindle 4 instead of having the roller on one side only and a tail on the other as shown, the seat could be reversed and would have the same shifting movement if rotated in either direction from either seating position.

From the foregoing it will be readily apparent that no heavy parts are required and that the construction is exceptionally light and that the pedestal requires a very small amount of floor space. Also, that the mechanism is free of rattle, noise and vibration and the seat is held firmly and positively in seating position while at the same time affording easy and convenient reversal of the seat, and automatic shifting during reversal such as permits reversal within a small space, and having an automatic shifting movement which allows the ends of the seat to be of full size, and that the construction includes many other improvements and advantages which will be readily recognized.

However, as many changes may be made in the above construction and as many apparently widely different embodiments of this invention could be made without departing from the scope thereof, it is to be understood that all matter contained in the above description or shown in the accompanying drawings be interpreted as illustrative and not in a limiting sense.

What I claim is:

1. In a car seat, in combination, a pedestal having a pair of tubular carriage guides, a carriage having a pair of tubes slidably mounted co-axially on said guides and having a vertical socket, a seat frame having a spindle journaled in said socket, said frame being rotatably carried on said carriage, means including a compression spring in each tubular guide bearing at one end against an element rigid with the pedestal and bearing at the other end against an element secured to the co-axial tube, yieldingly holding the carriage in an extreme shifted position on the pedestal, a cam plate mounted on the pedestal and a co-acting cam member fixed to the spindle for rotation therewith, for shifting the seat frame and carriage on the pedestal and against the tension of said springs, when the seat frame and spindle are rotated on the carriage.

2. In a reversible car seat, in combination, a pedestal, a carriage and a seat frame, said pedestal including two parallel spaced supporting plates, and a pair of spaced parallel tubular guides extending between and secured at their ends to said supporting plates, one of said plates having a cam flange, said carriage having a vertical socket and a pair of tubes mounted co-axially on said guides and slidable thereon, and said seat frame having a spindle journaled in said socket and rotatably carried on said carriage, and a cam member fixed to said spindle and co-acting with said cam flange when the seat frame and spindle are rotated on the carriage in a direction riding the cam member along the cam flange, for shifting the seat frame and carriage on the pedestal.

3. In a reversible car seat, in combination, a pedestal, a carriage and a seat frame, said pedestal including two parallel spaced supporting plates, and a pair of spaced parallel tubular guides extending between and secured at their ends to said supporting plates, one of said plates having a cam flange, said carriage having a vertical socket and a pair of tubes mounted co-axially on said guides and slidable thereon, and said seat frame having a spindle journaled in said socket and rotatably carried on said carriage, and a cam member fixed to said spindle and co-acting with said cam flange when the seat frame and spindle are rotated on the carriage in a direction riding the cam member along the cam flange, for shifting the seat frame and carriage on the pedestal, and a stop member fixed to the spindle and co-acting with said cam flange preventing rotation of seat frame in a contrary direction.

4. In a reversible car seat, in combination, a pedestal, a carriage and a seat frame, said pedestal including two spaced parallel supporting plates, and a pair of spaced parallel tubular guides extending between and secured to said supporting plates, one of said supporting plates being angular and having a cam flange above said tubular guides, said carriage having a vertical socket and a pair of tubes mounted co-axially on said guides and slidable thereon, and said seat frame having a spindle journaled in said socket and rotatably carried on said carriage, and a cam member fixed to said spindle and co-acting above said guides with said cam flange, for shifting the carriage and seat frame on the pedestal.

5. In a reversible car seat, in combination, a pedestal, a carriage and a seat frame, said pedestal including a base assembly having a pair of spaced supporting legs at each end of the assembly and an end plate bridging and secured on each pair of said legs and a pair of spaced parallel guide tubes extending between and secured at their opposite ends to said end plates, said carriage having a vertical socket extending downwardly intermediate said legs and having a pair of spaced parallel slide tubes co-axially mounted on said guide tubes and slidable thereon, a downwardly extending spindle fixed to the seat frame and journaled in said socket, spring means engaged with elements secured to said carriage and to said pedestal yieldingly drawing the carriage to one end of the pedestal, and cam means, including co-acting cam members on the spindle and on one of said end plates, for shifting the carriage and seat frame toward the opposite end of the pedestal when the seat frame is rotated on the carriage.

6. In a car seat, in combination, a pedestal having a pair of tubular carriage guides, a carriage having a pair of tubes slidably mounted co-axially on said guides and having a vertical socket, a seat frame having a spindle journaled in said socket, said frame being rotatably carried on said carriage, and means including a compression spring in each tubular guide connected at one end to the pedestal and connected at the other end to the co-axial tube, yieldingly holding the carriage in an extreme shifted position on the pedestal.

7. In a car seat, in combination, a pedestal having a pair of tubular carriage guides, a carriage having a pair of tubes slidably mounted co-axially on said guides and having a vertical socket, a seat frame having a spindle journaled in said socket, said frame being rotatably carried on said carriage, an abutment block slidably mounted in one of said tubular guides, a stationary abutment in said guide, a compression spring engaged between said abutments, and a member connecting the slidable abutment block to the co-axial tube and shiftable in a slot in the guide, whereby the carriage is yieldingly held in an extreme position on the pedestal.

8. In a car seat of the character described, in combination, a pedestal, a carriage including a vertical socket, slide members on opposite sides of the socket engaging the pedestal whereby the carriage is slidably supported thereon, an upper plate secured to said slide members and to the socket near its upper end, a lower plate secured to said slide members and to said socket centrally, and brace members secured to the slide members and to the lower end of said socket, and a seat frame rotatably carried on the carriage and having a spindle journaled in said socket.

ALFRED B. BELL.